(12) United States Patent
Koysman

(10) Patent No.: US 12,472,856 B2
(45) Date of Patent: Nov. 18, 2025

(54) CAR SEAT LINER

(71) Applicant: Exceptional Concepts LLC, New York, NY (US)

(72) Inventor: Alisa Koysman, Edina, MN (US)

(73) Assignee: Exceptional Concepts LLC, New York, NY (US)

( * ) Notice: Subject to any disclaimer, the term of this patent is extended or adjusted under 35 U.S.C. 154(b) by 153 days.

(21) Appl. No.: 18/614,446

(22) Filed: Mar. 22, 2024

(65) Prior Publication Data

US 2024/0317124 A1     Sep. 26, 2024

Related U.S. Application Data

(60) Provisional application No. 63/454,283, filed on Mar. 23, 2023.

(51) Int. Cl.
*B60N 2/60*     (2006.01)
*B60N 2/26*     (2006.01)
*B60N 2/28*     (2006.01)

(52) U.S. Cl.
CPC .................. *B60N 2/60* (2013.01); *B60N 2/26* (2013.01); *B60N 2/2881* (2013.01)

(58) Field of Classification Search
CPC ........... B60N 2/60; B60N 2/26; B60N 2/2881
See application file for complete search history.

(56) References Cited

U.S. PATENT DOCUMENTS

| | | | | |
|---|---|---|---|---|
| 4,885,200 A | * | 12/1989 | Perdelwitz, Jr. | B60N 2/60 428/920 |
| 4,892,769 A | * | 1/1990 | Perdelwitz, Jr. | B32B 27/12 5/413 R |
| 5,735,576 A | * | 4/1998 | Pepys | B60N 2/80 297/DIG. 6 |
| 5,829,829 A | * | 11/1998 | Celestina-Krevh | B60N 2/2851 5/640 |
| 6,752,457 B2 | * | 6/2004 | Gold | A47D 15/006 297/219.12 |
| 6,926,359 B2 | * | 8/2005 | Runk | B60N 2/2812 297/229 |
| 7,677,661 B1 | | 3/2010 | Ferrari-Cicero et al. | |

* cited by examiner

*Primary Examiner* — Brian M O'Hara
(74) *Attorney, Agent, or Firm* — MASCHOFF BRENNAN; Benjamin Charkow

(57) ABSTRACT

A liner for a child safety seat designed with horizontal slits and fasteners and an elastic gathering at the upper portion of the car seat liner to permit the car seat liner to be draped over and secured to the car seat using a five-point harness system. The overlapping portions of the car seat liner prevent a car seat from becoming soiled when used by an infant or child.

9 Claims, 3 Drawing Sheets

CAR SEAT LINER

FIELD OF THE INVENTION

The present invention relates generally to a liner specifically designed to cover and keep conventional automobile child safety seats clean.

BACKGROUND OF THE INVENTION

Child safety seats (i.e., car seats) are notoriously difficult to keep clean as their occupants (i.e., infants or toddlers) often soil their child safety seat following diaper malfunctions, toilet training accidents, vomiting from car sickness, or messy eating while seated in the child safety seat. However, laundering any textiles which are part of the child safety seat is deemed unsafe by child safety agencies and car seat manufacturers because the laundering process breaks down the physical integrity of the child safety seat materials and thus, the safety which the components provide. As a result, families are frequently driving around with their infants or toddlers sitting in soiled car seats.

Accordingly, there exists a need to provide a barrier from soilage, to keep the textiles of the child safety seat dry, clean, and safe.

SUMMARY OF THE INVENTION

A liner for an automobile child safety seat (i.e., a car seat liner) is provided. The car seat liner of the present invention provides a turn-key solution to car seat owners desiring to keep their car seats clean and dry. In a preferred embodiment, the liner is comprised of a disposable material.

The car seat liner comprises a lower portion, a middle portion, and an upper portion, including a central chassis extending along a longitudinal length of the car seat liner through the lower portion, middle portion, and upper portion. The car seat liner has a first edge and third edge aligned with a longitudinal axis of the car seat liner and a second and fourth edge aligned with a lateral axis of the car seat liner.

The upper portion of the car seat liner is coupled to the middle portion at a first line extending along the lateral axis at the top of a five point harness of a car seat when the car seat liner is draped on a car seat. Two pairs of opposing slits located between the upper portion and middle portion and between the middle portion and the lower portion of the car seat liner permit the five point harness of the car seat to be located above the car seat liner, with the remainder of the car seat being below the car seat liner to protect it from soiling. A first and second slit extend symmetrically along the first line from opposing edges of the car seat liner to the central chassis, such that a first upper flap portion, a second upper flap portion, an upper half of a first middle flap portion and an upper half of a second middle flap portion are formed.

The lower portion of the car seat liner is coupled to the middle portion at a second line extending along the lateral axis at the top of the first and second hip straps of a five point harness of a car seat when the car seat liner is draped on a car seat, with a third and fourth slit extending symmetrically from opposing edges of the car seat liner to a point on the central chassis along the second line, such that a first lower flap portion, a second lower flap portion, a lower half of the first middle flap portion and a lower half of the second middle flap portion are formed. In embodiments, the third and fourth slits extend from opposing edges of the car seat liner from a point below the second line to a point on the central chassis along the second line.

The upper half of the first middle flap portion and the lower half of the first middle flap portion form the first middle flap portion. The upper half of the second middle flap portion and the lower half of the second middle flap portion form the second middle flap portion.

To permit the crotch strap (i.e., bottom buckle) of the five point harness to pass through the car seat liner when the car seat liner is draped on a car seat, a fifth slit, that extends laterally, is located in the central chassis of the lower portion, and is aligned with the bottom buckle.

In embodiments, the car seat liner further comprises an outer (i.e., seat facing) layer and an inner (i.e., child facing) layer joined along a perimeter of the car seat liner. In embodiments, the outer layer of the car seat liner is bonded to the inner layer. The seat facing element section (i.e., the outer layer), which is positioned over and in connection with the seat, is comprised of a water-resistant yet non-irritating material, such as a thin layer of polyethylene or the like. The child facing element (i.e., the inner layer), which faces in the direction of the infant or child when sitting in the car seat and would interface with the child's clothing or skin, is comprised of one or more layers fabricated from materials such as thin quilted shredded paper, high quality polymers, non-woven fabric, and/or wood pulp.

In embodiments, an elastic material in a stretched state is located between the outer layer and the inner layer along the top lateral edge (i.e., the second edge). In accordance with this embodiment, when the elastic material is in a relaxed state, the top edge (i.e., second edge) of the car seat liner gathers inward and can be used to create a secure fit when draped over the car seat.

In embodiments, the open-ended longitudinal edge slits are secured at the open end with fastening and mating fastening components at varying degrees of overlap, so that when the car seat liner is used in connection with a five-point safety harness, the harness straps are secured within the longitudinal edge slits. The fastening and mating fastening components permit the adjustment of the longitudinal edge slits such that they are adjustable to function with various conventional child safety seats. In embodiments, the fastening and mating fastening components are adapted to refastenably (1) fasten the first and second upper flap portions to the respective upper halves of the first and second middle flap portions; and (2) fasten the lower halves of the first and second middle flap portions to the respective first and second lower flap portions.

The fastening and mating fastening components may be comprised of hook and loop tabs, cellophane tape, and the like.

In embodiments, a first fastening component is disposed on the first upper flap portion proximal to the first edge, a second fastening component is disposed on the second upper flap portion proximal to the third edge, a third fastening component is disposed on the lower half of the first middle flap portion proximal to the first edge and a fourth fastening component is disposed on the lower half of the second middle flap portion proximal to the third edge.

In embodiments, one or more of the mating fastening components are integral portions of the inner layer. In other words, the inner layer of the car seat liner functions as one or more of the mating fastening components, with the inner layer functioning as the loops for a hook and loop assembly, thus permitting a wider range of fastening options. In accordance with this embodiment, the fastening components can connect the upper flaps of the car seat liner to the middle flaps of the car seat liner and the middle flaps of the car seat liner to the lower flaps of the car seat liner at varying points on the longitudinal and lateral axes, following the width and curves of each child safety seat. This allows for a custom fit adjustable to the various sized car seats currently on the market.

In embodiments, where the mating fastening components are not integral portions of the inner layer, the mating fastening components are disposed on the inner layer of the car seat liner. Specifically, a first mating fastening component is disposed on the upper half of the first middle flap portion proximal to the first edge, a second mating fastening component is disposed on the upper half of the first middle flap portion proximal to the third edge, a third mating fastening component is disposed on the first lower flap portion proximal to the first edge and a fourth mating fastening component is disposed on the second lower flap portion proximal to the third edge.

In embodiments, the fastening and mating fastening components are located near the respective corners of the flap portions of the inner layer formed by the horizontal slits extending from the opposing edges of the car seat liner to the central chassis.

In embodiments, the fastening components and mating fastening components each comprise mechanical fasteners.

In embodiments, the outer layer is an impermeable material such as polyethylene. The inner layer is an absorbent material such as multiple layers of thin quilted, shredded paper, high quality, polymers, non-woven fabric, wood pulp, or the like.

In embodiments, through use of the fastening and mating fastening components, adjustment of the product to various manufacturers' models and harness level settings is easily accomplished.

These and other features of this invention are described in, or are apparent from, the following detailed description of various exemplary embodiments of this invention.

BRIEF DESCRIPTION OF THE DRAWINGS

Exemplary embodiments of this invention will be described with reference to the accompanying figures wherein.

DETAILED DESCRIPTION OF THE EXEMPLARY EMBODIMENTS

Figure 1:
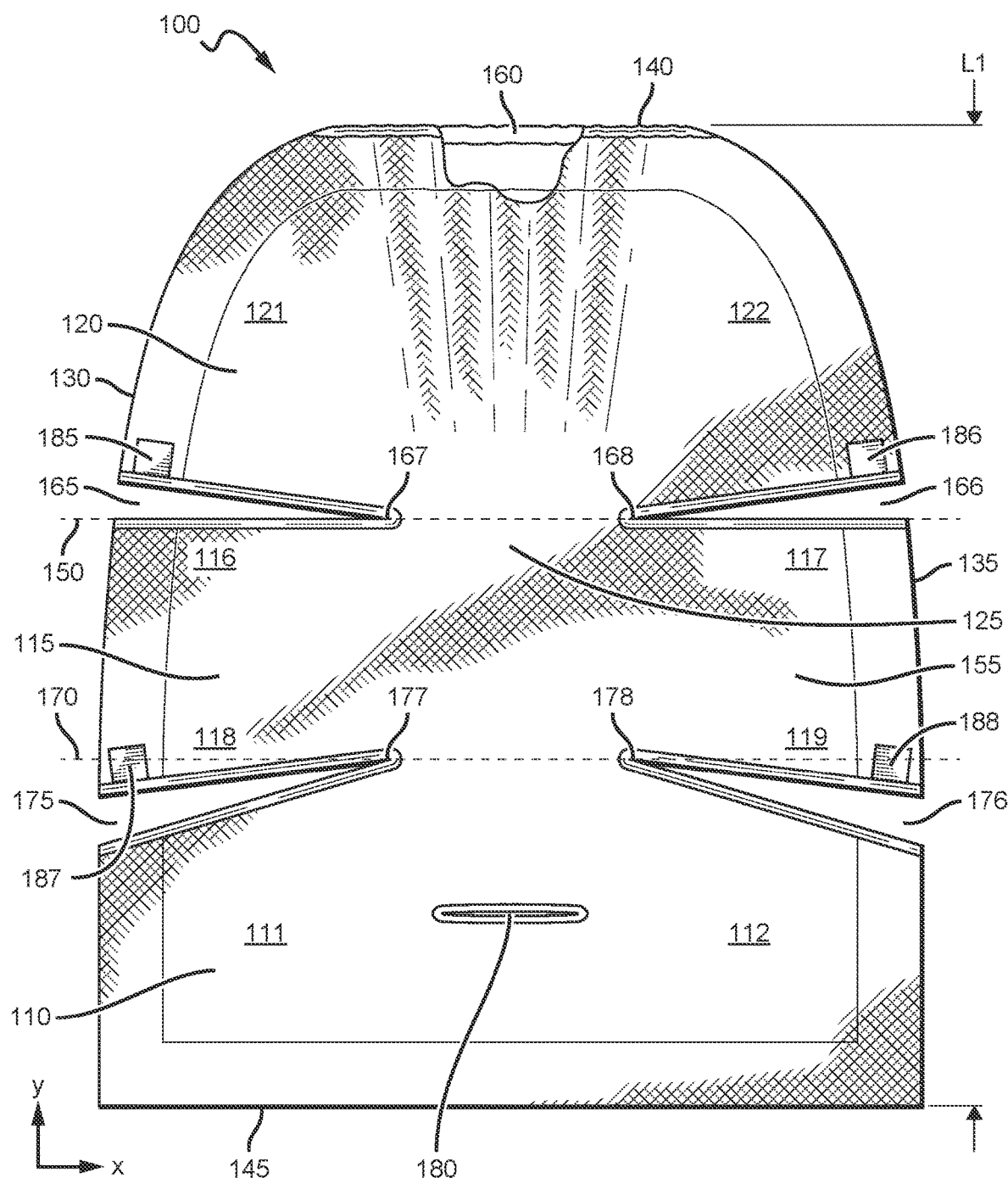
FIG. 1 is a front elevational view (i.e., a view of the outer layer) of the car seat liner of the present invention.

With reference to FIG. 1, the details of the construction of the car seat liner 100 (and in particular outer layer 155) are shown. Car seat liner 100 is shown in a flat state, before it is draped over a car seat (not shown). In embodiments, the car seat liner 100 has a lower portion 110, middle portion 115 and upper portion 120, with a central chassis 125 extending along a longitudinal length L1 of car seat liner 100 through lower portion 110, middle portion 115 and upper portion 120.

Car seat liner 100 has a first edge 130 and third edge 135 aligned with a longitudinal axis Y of the car seat liner. Car seat liner 100 has a second edge 140 and a fourth edge 145 aligned with a lateral axis X of the car seat liner.

Upper portion 120 is coupled to middle portion 115 at first line 150 extending along lateral axis X at the top of a five point harness of a car seat when car seat liner 100 is draped on a car seat (not shown), with first slit 165 and second slit 166 extending symmetrically from opposing edges of car seat liner 100. Specifically, first slit 165 extends along first line 150 from first edge 130 to point 167 on central chassis 125 such that first upper flap portion 121 and upper half of first middle flap portion 116 are formed. Second slit 166 extends along first line 150 from third edge 135 to point 168 on central chassis 125 such that second upper flap portion 122 and upper half of second middle flap portion 117 are formed.

Lower portion 110 is coupled to middle portion 115 at second line 170 extending along lateral axis X at the top of the first and second hip straps of a five point harness of a car seat when the car seat liner is draped on a car seat (not shown), with third slit 175 and fourth slit 176 extending symmetrically from opposing edges of car seat liner 100. Specifically, third slit 175 extends along third line 170 from first edge 130 to point 177 on central chassis 125 such that first lower flap portion 111 and lower half of first middle flap portion 118 are formed. Fourth slit 176 extends along first line 170 from third edge 135 to point 178 on central chassis 125 such that second lower flap portion 112 and lower half of second middle flap portion 119 are formed. In the embodiment shown in FIG. 1, third slit 175 and fourth slit 176 extend from opposing edges of car seat liner 100 from a point below second line 170 to points 177 and 178 on central chassis 125 along second line 170.

In embodiments, the width of car seat liner 100 is approximately 31 inches and length L1 is approximately 36 inches. First slit 165 and second slit 166 are located at approximately 21.5 inches above bottom lateral edge (i.e., fourth edge 145) of car seat liner 100. Third slit 175 and fourth slit 176 are located approximately 9.5 inches above fourth edge 145 of car seat liner 100. Fifth slit 180 is located towards the lower middle portion of the liner (within lower portion 110), about 7 inches above fourth edge 145 and is approximately 5.5 inches wide.

Fifth slit 180 is located in the lower portion 110 of central chassis 125, extending laterally so that the bottom buckle of a five point harness of a car seat can pass through fifth slit 180 when car seat liner 100 is draped on a car seat (not shown).

In the embodiment shown in FIG. 1, car seat liner comprises two layers, namely outer layer 155 and inner layer (not shown) joined along the perimeter of car seat liner 100. In embodiments, outer layer 155 is bonded to the inner layer.

In embodiments, to improve the fit of car seat liner 100 over the top portion of a car seat, elastic material 160 in a stretched state is located between outer layer 155 and the inner layer. In a relaxed state, elastic material 160 causes upper portion 120 of car seat liner 100 to gather as seen in FIG. 1. This portion can then be stretched over the top of a car seat liner for a secure fit. In embodiments, elastic material comprises a set of elastic threads stitched into the car seat liner, but can be of any configuration that results in an elasticized section of upper portion 120.

In embodiments, to provide for a more secure fit of car seat liner 100 on a car seat, the car seat liner is equipped with fastening components to fasten upper portion 120 to middle portion 115 and to fasten middle portion 115 to lower portion 110. As seen in FIG. 1, first mating fastening component 185 is disposed on first upper flap portion 121 of the outer layer proximal to first edge 130 and is optimally designed to mate with the upper half of the first middle flap portion of the inner layer 216 shown in FIG. 2. Second fastening component 186 is disposed on second upper flap portion 122 of the outer layer proximal to third edge 135 and is optimally designed to mate with the upper half of the second middle flap portion of the inner layer 217 shown in FIG. 2. Third fastening component 187 is disposed on lower half of first middle flap portion 118 and is optimally designed to mate with the upper region of the first lower flap portion 211 shown in FIG. 2. Fourth fastening component 188 is disposed on lower half of second middle flap portion 119 and is optimally designed to mate with the upper region of second lower flap portion 212 shown in FIG. 2.

In embodiments where the inner layer of car seat liner 100 comprises a material that functions as a fastening material, the fastening components may fasten with any portion of the inner layer to form a secure fit around a car seat when car seat liner 100 is placed over a car seat. In embodiments, mating fastening components may be placed on the inner layer. In embodiments, the fastening and mating fastening components (when used) each comprise mechanical fasteners.

Figure 2:
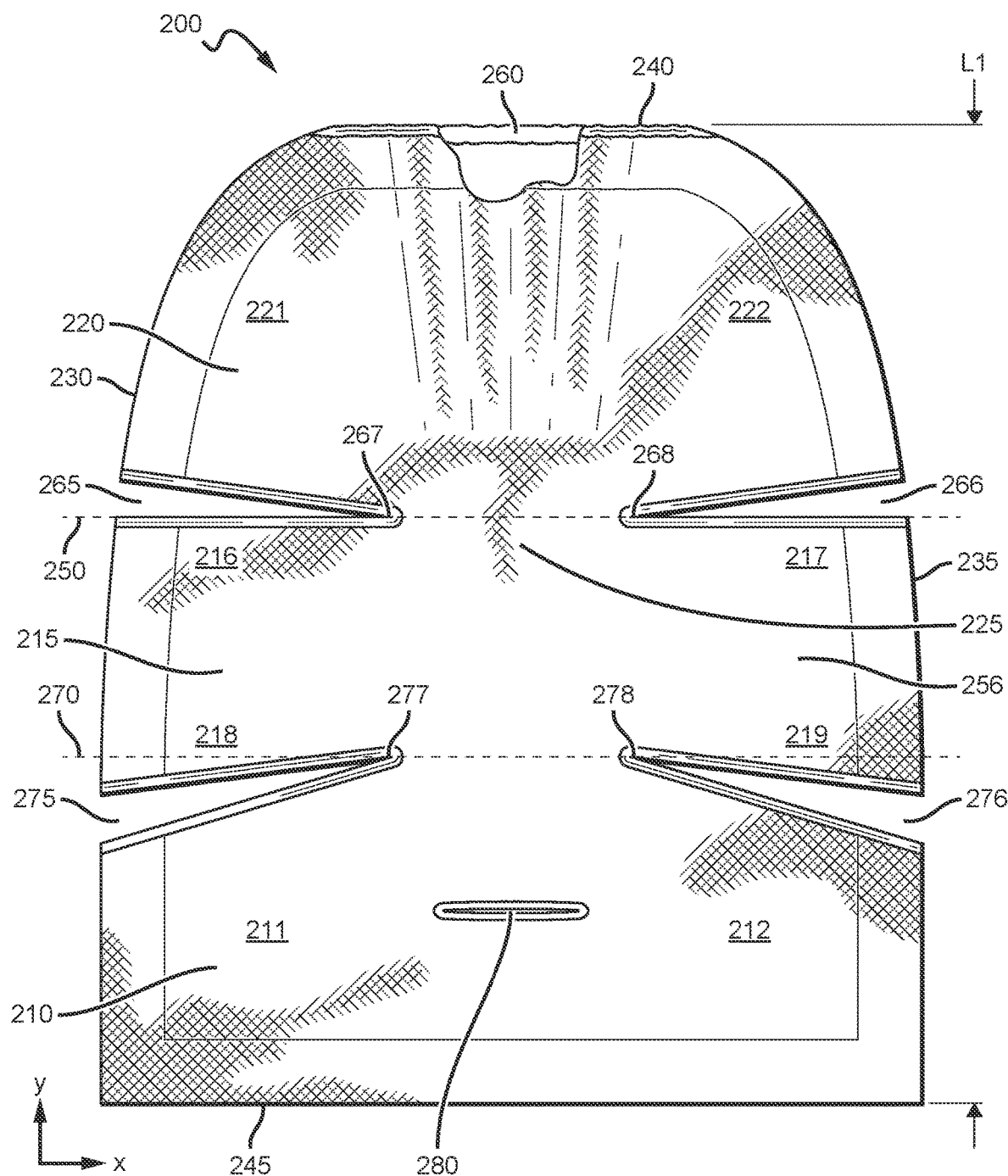
FIG. 2 is a rear elevational view (i.e., a view of the inner layer) of the car seat liner of the present invention.

Turning to FIG. 2, the elements of inner layer 256 are shown. Except for the absence of fastening components, inner layer 256 is a mirror image of the outer layer 155 shown in FIG. 1. In embodiments, inner layer 256 and the outer layer may be comprised of one piece of material. In the embodiment shown in FIGS. 1-3, the outer layer (not shown in FIG. 2) and inner layer 256 comprise separate pieces of material joined along the perimeter of car seat liner 100.

Car seat liner 200 is shown in a flat state, with inner layer 256 showing, before it is draped over a car seat (not shown). When draped over a car seat, inner layer 256 will face the child sitting on car seat liner 200. In embodiments, the car seat liner 200 has a lower portion 210, middle portion 215 and upper portion 220, with a central chassis 225 extending along a longitudinal length L1 of car seat liner 200 through lower portion 210, middle portion 215 and upper portion 220.

Car seat liner 200 has a first edge 230 and third edge 235 aligned with a longitudinal axis Y of the car seat liner. Car seat liner 200 has a second edge 240 and a fourth edge 245 aligned with a lateral axis X of the car seat liner.

Upper portion 220 is coupled to middle portion 215 at first line 250 extending along lateral axis X at the top of a five point harness of a car seat when car seat liner 200 is draped on a car seat (not shown), with first slit 265 and second slit 266 extending symmetrically from opposing edges of car seat liner 200. Specifically, first slit 265 extends along first line 250 from first edge 230 to point 267 on central chassis 225 such that first upper flap portion 221 and upper half of first middle flap portion 216 are formed. Second slit 266 extends along first line 250 from third edge 235 to point 268 on central chassis 225 such that second upper flap portion 222 and upper half of second middle flap portion 217 are formed.

Lower portion 210 is coupled to middle portion 215 at second line 270 extending along lateral axis X at the top of the first and second hip straps of a five point harness of a car seat when the car seat liner is draped on a car seat (not shown), with third slit 275 and fourth slit 276 extending symmetrically from opposing edges of car seat liner 200. Specifically, third slit 275 extends along third line 270 from first edge 230 to point 277 on central chassis 225 such that first lower flap portion 211 and lower half of first middle flap portion 218 are formed. Fourth slit 276 extends along first line 270 from third edge 235 to point 278 on central chassis 225 such that second lower flap portion 212 and lower half of second middle flap portion 219 are formed. In the embodiment shown in FIG. 2, third slit 275 and fourth slit 276 extend from opposing edges of car seat liner 200 from a point below second line 270 to points 277 and 278 on central chassis 225 along second line 270.

Fifth slit 280 is located in the lower portion 210 of central chassis 225, extending laterally so that the bottom buckle of a five point harness of a car seat can pass through fifth slit 280 when car seat liner 200 is draped on a car seat (not shown). Elastic material 260 is shown in the cut out on FIG. 2, below inner layer 256.

In the embodiment shown in FIG. 2, inner layer 256 is constructed of a material that acts as a mating fastening component. In embodiments, mating fastening components may be included on inner layer 256. Specifically, a first mating fastening component may be disposed on the upper half of the first middle flap portion 216 of the outer layer proximal to first edge 230, a second mating fastening component may be disposed on the upper half of the second middle flap portion 217 of the inner layer proximal to third edge 235, with the first fastening component 185 (from FIG. 1) and second fastening component 186 (from FIG. 1) adapted to refastenably engage the first and second mating fastening components (not shown in the embodiment in FIG. 2).

In an embodiment with mating fastening components, a third mating fastening component is disposed on the first lower flap portion 211 of the inner layer proximal to first edge 230 and a fourth mating fastening component is disposed on the second lower flap portion 212 of the inner layer proximal to third edge 235 with the third fastening component 187 (from FIG. 1) and fourth fastening component 188 (from FIG. 1) adapted to refastenably engage the third and fourth mating fastening components (not shown in the embodiment in FIG. 2).

Figure 3:
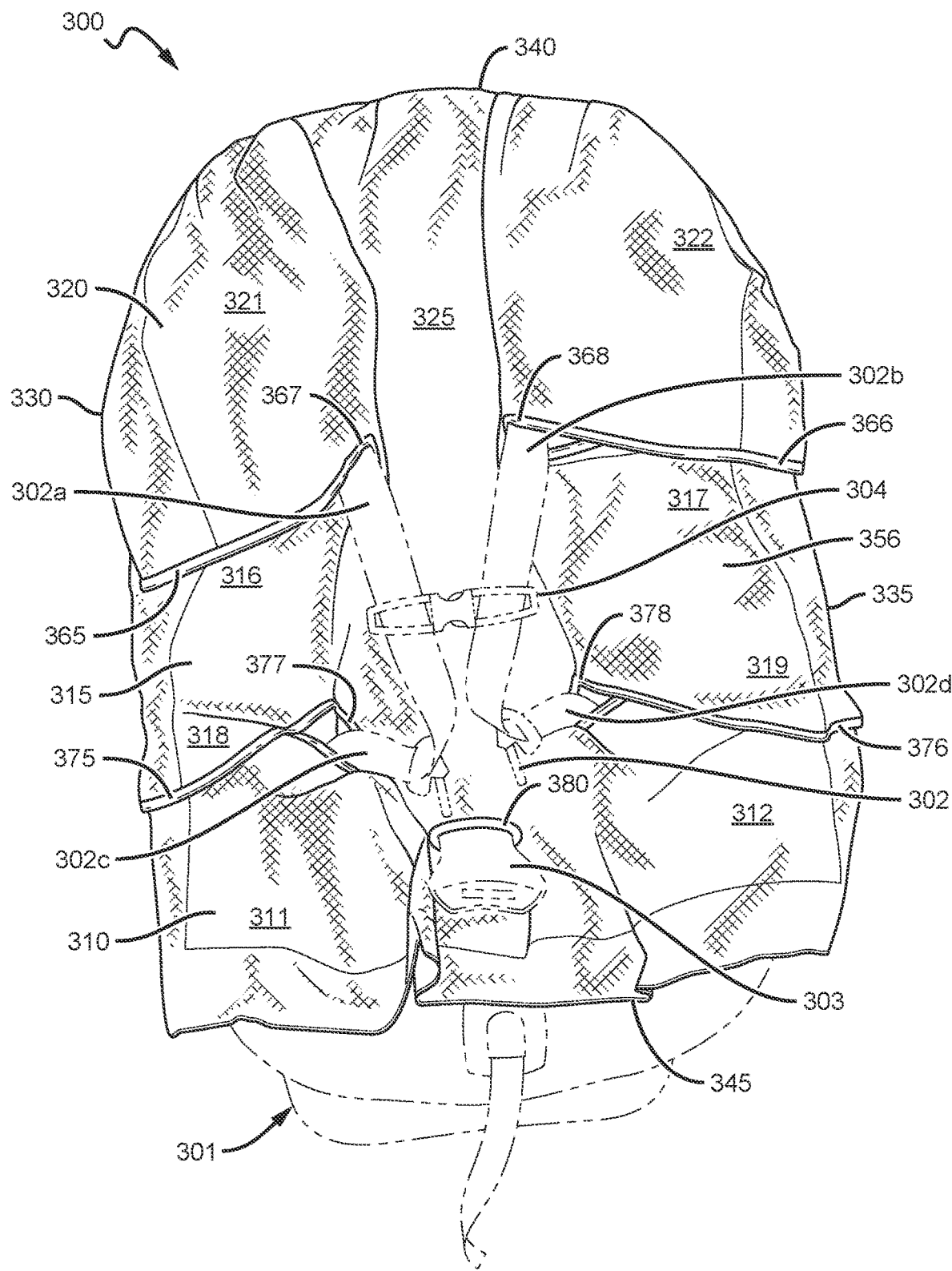
FIG. 3 is a perspective view of the car seat liner of the present invention shown covering a car seat.

Turning to FIG. 3, car seat liner 300 is shown in use with car seat 301. As shown in FIG. 3, once car seat liner 300 is draped over car seat 301, car seat liner 300 takes the shape of the car set. The elastic top edge gatherings (shown in FIGS. 1 and 2) allow car seat liner 300 to curve over the backrest portion of car seat 301, and thus are not seen in FIG. 3.

In embodiments, the top portions of the car seat liner overlap the middle portions of the car seat liner and the middle portions of the car seat liner overlap the lower portions of the car seat liner. This is shown in FIG. 3 where first upper flap portion 321 overlaps the upper half of first middle flap portion 316, second upper flap portion 322 overlaps the upper half of second middle flap portion 317, and the lower half of first middle flap portion 318 overlaps first lower flap portion 311 and the lower half of second middle flap portion 319 overlaps second lower flap portion 312. In the embodiment shown in FIG. 3, fastening components 185, 186, 187 and 188 on the outer layer, shown in FIG. 1, are used to mate with the described portions of inner layer, which faces the child sitting on the car seat. This permits car seat liner 300 to be adjusted for the curve and size of car seat 301. Use of the fastening components further secures car seat liner 300 to car seat 301 along the first edge 330 and third edge 335 of car seat liner 300.

The configuration illustrated in FIG. 3, namely the upper portions overlapping the middle portions and the middle portions overlapping the lower portions as described above, encourages any soiling material related to the child sitting on the car seat liner (i.e., food, vomit) to continue traveling down the car seat liner, without getting stuck at one of the fastening sites between the upper and middle portions or the middle and lower portions.

In the embodiment shown in FIG. 3, the outer layer (not shown) faces the car seat and inner layer 356 is exposed, i.e., facing the direction where the child would sit on the car seat. The elasticized portion of upper portion 320 is draped over the backside of car seat 301, securing car seat liner 300 in place. The first middle flap portion (including the upper half of first middle flap portion 316 and the lower half of first middle flap portion 318) is inserted through strap 302a of the five-point harness system of car seat 301. The second middle flap portion (including the upper half of second middle flap portion 317 and the lower half of second middle flap portion 319) is inserted through strap 302b of the five-point harness system of car seat 301. This configuration ensures that the buckles of car seat 301 remain uncovered so that they may be used to secure the occupant of car seat 301 while at the same time covering car seat 301 with car seat liner 300.

In the center of lower portion 310, is fifth slit 380, which functions as an opening through which a bottom buckle 303 of the five-point harness can be passed, permitting car seat 301 to be fully used while the occupant (i.e., the infant or the child) is in car seat 301 while also sitting on car seat liner 300. Clip 304, typically found in car seats, keeps straps 302a and 302b together. Portions of car seat liner 300, mainly those proximal to first edge 330 and third edge 335, overhang the footprint of car seat 301, providing additional protection from soiling of the car seat.

Now that embodiments of the present invention have been shown and described in detail, various modifications and improvements thereon will become readily apparent to those skilled in the art. Accordingly, the exemplary embodiments of the invention, as set forth above, are intended to be illustrative, not limiting. The spirit and scope of the present invention is to be construed broadly.

What is claimed is:

1. A car seat liner comprising:
a lower portion, a middle portion, and an upper portion, including a central chassis extending along a longitudinal length of the car seat liner through the lower portion, middle portion, and upper portion, the car seat liner having a first edge and third edge aligned with a longitudinal axis of the car seat liner and having a second edge and fourth edge aligned with a lateral axis of the car seat liner;
wherein the upper portion is coupled to the middle portion at a first line extending along the lateral axis at the top of a five point harness of a car seat when the car seat liner is draped on a car seat, with a first slit and second slit extending symmetrically along the first line from opposing edges of the car seat liner to a point on the central chassis, such that a first upper flap portion, a second upper flap portion, an upper half of a first middle flap portion and an upper half of a second middle flap portion are formed;
wherein the lower portion is coupled to the middle portion at a second line extending along the lateral axis at the top of the first and second hip straps of a five point harness of a car seat when the car seat liner is draped on a car seat, with a third slit and fourth slit extending symmetrically from opposing edges of the car seat liner to a point on the central chassis along the second line, such that a first lower flap portion, a second lower flap portion, a lower half of the first middle flap portion and a lower half of the second middle flap portion are formed;
wherein a fifth slit located in the central chassis of the lower portion, extends laterally so that the bottom buckle of a five point harness of a car seat can pass through the fifth slit when the car seat liner is draped on a car seat; and wherein:
a third fastening component is disposed on the lower half of the first middle flap portion of the outer layer proximal to the first edge;
a fourth fastening component is disposed on the lower half of the second middle flap portion of the outer layer proximal to the third edge;
a third mating fastening component is disposed on the first lower flap portion of the inner layer proximal to the first edge;
a fourth mating fastening component is disposed on the second lower flap portion of the inner layer proximal to the third edge;
wherein the third and fourth fastening components are adapted to refastenably engage the third and fourth mating fastening components.

2. The car seat liner of claim 1, wherein:
the car seat liner further comprises an outer layer and an inner layer joined along a perimeter of the car seat liner.

3. The car seat liner of claim 1, wherein:
the car seat liner further comprises an outer layer bonded to an inner layer.

4. The car seat liner of claim 3, wherein:
an elastic material in a stretched state is located between the outer layer and the inner layer along the second edge.

5. The car seat liner of claim 4, wherein:
a first fastening component is disposed on the first upper flap portion of the outer layer proximal to the first edge;
a second fastening component is disposed on the second upper flap portion of the outer layer proximal to the third edge;
a first mating fastening component is disposed on the upper half of the first middle flap portion of the inner layer proximal to the first edge;
a second mating fastening component is disposed on the upper half of the second middle flap portion of the inner layer proximal to the third edge;
wherein the first and second fastening components are adapted to refastenably engage the first and second mating fastening components.

6. The car seat liner of claim 5, wherein the fastening components and mating fastening components each comprise mechanical fasteners.

7. The car seat liner of claim 6, wherein:
the outer layer is an impermeable material and the inner layer is an absorbent material.

8. The car seat liner of claim 7, wherein:
the first mating fastening component, second mating fastening component, third mating fastening component and fourth mating fastening component comprise integral portions of the inner layer.

9. The car seat liner of claim 8, wherein:
the third and fourth slits extend from opposing edges of the car seat liner from a point below the second line to a point on the central chassis along the second line.

* * * * *